United States Patent
Liu et al.

(10) Patent No.: US 7,632,057 B2
(45) Date of Patent: Dec. 15, 2009

(54) HANDLING APPARATUS FOR INFORMATION STORAGE DISKS AND CONVEYING APPARATUS FOR THE SAME

(75) Inventors: Ming-Hsun Liu, 3F, No. 8, Lane 143, Xinming Rd., Neihu District, Taipei (TW) 11471; Zong-Wei Dong, Taipei (TW)

(73) Assignee: Ming-Hsun Liu, Taipei (TW)

( * ) Notice: Subject to any disclaimer, the term of this patent is extended or adjusted under 35 U.S.C. 154(b) by 315 days.

(21) Appl. No.: 11/745,458

(22) Filed: May 8, 2007

(65) Prior Publication Data
US 2008/0279657 A1  Nov. 13, 2008

(51) Int. Cl.
*B25J 18/00* (2006.01)
(52) U.S. Cl. .................. 414/744.3; 414/792.9
(58) Field of Classification Search .......... 414/74.3, 414/792.9, 793, 793.2, 744.3; 198/470.1, 198/476.1, 478.1, 477.1
See application file for complete search history.

(56) References Cited

U.S. PATENT DOCUMENTS 6,129,320 A * 10/2000 Warren-Pfaeffle ........ 248/124.1

* cited by examiner

*Primary Examiner*—Donald Underwood
(74) *Attorney, Agent, or Firm*—Pai Patent & Trademark Law Firm; Chao-Chang David Pai

(57) ABSTRACT

A handling apparatus for information storage disks includes a conveying apparatus and a mounting base. The conveying apparatus includes a body, a conveying arm, a transmission device and a driving device. The body includes an arm holder. The arm holder has a guide channel. The guide channel includes a transverse passage and a longitudinal passage. The conveying arm is movably mounted in the arm holder and moves along the guide channel. The transmission device connects the driving device to the conveying arm so that the driving device moves the conveying arm in the guide channel. When the conveying arm moves in the transverse passage, the conveying arm has at least one linear self-alignment for positioning.

17 Claims, 8 Drawing Sheets

HANDLING APPARATUS FOR INFORMATION STORAGE DISKS AND CONVEYING APPARATUS FOR THE SAME

BACKGROUND

1. Field of the Invention

The present invention relates to a handling apparatus for information storage disks. More particularly, the present invention relates to a handling apparatus that conveys the information disks among several working locations.

2. Description of Related Art

Information storage disks such as compact disks including Compact Disc-Recordable (CD-R), Compact Disc ReWritable (CD-RW), DVD recordable (DVD-R) etc. store digital information in a variety of formats. Compact disk drives or burners are common devices used to access the information storage disks.

There is a need to transport the information storage disks among several working locations or devices. Automatic disk handling apparatus and processing systems have been developed to increase efficiency and convenience of working. For example, when disk duplication process is performed, a blank disk is conveyed from its original location (a first location) for storage onto a tray of a duplicating apparatus (a second location) to duplicate. When the disk duplication is completed and the tray ejects the disk, the disk is removed from the tray (the second location) and conveyed to another location for storage (a third location). However, if the disk duplication fails, the disk is conveyed to another location for storage (a fourth location).

When the automatic disk handling apparatus conveys the disk among the different locations, ability to precisely position or align the disk at a given location is needed so as to accurately pick the disk up from or put the disk down on the tray or a disk holder (such as a spindle).

Therefore, there is a need to provide a handling apparatus for information storage disks to mitigate or obviate the aforementioned problems.

SUMMARY

An object of the present invention is to provide a handling apparatus for information storage disks. The handling apparatus comprises a conveying arm with accurate self-alignment to process, convey and stack disks.

An object of the present invention is to provide a conveying apparatus for information storage disks. The conveying apparatus comprises a conveying arm with accurate self-alignment to convey disks to a given location.

A handling apparatus comprises a disk conveying apparatus and a mounting base. The disk conveying apparatus comprises a body, a conveying arm, a power transmission device and a driving device. The body comprises an arm holder and a base. The arm holder comprises an arm channel with a longitudinal passage and a transverse passage, where the longitudinal passage communicates with the transverse passage. The base comprises a top, a front, a rear, a left and a right where the arm holder is mounted at the rear. The conveying arm is movably mounted in the arm holder and moves along the arm channel. The power transmission device connects to the conveying arm. The driving device connects to the power transmission device through which the driving device moves the conveying arm. The conveying arm has at least one linear self-alignment when the conveying arm moves along the transverse passage.

The mounting base is demountably connected to the disk conveying apparatus at one side of the front, the left and the right of the base.

According to an embodiment of the present invention, the transverse passage comprises a top edge, a bottom edge and an urging edge. The top edge comprises a guiding step. The bottom edge comprises an urging step associated with the guiding step. The conveying arm has a first linear self-alignment and a second linear self-alignment when the conveying arm moves along the transverse passage. The first linear self-alignment is urged by the conveying arm abutting and moving along the urging step. The second linear self-alignment is urged by the conveying arm abutting and moving along the urging edge. Both the first linear self-alignment and the second linear self-alignment are upward movements from the bottom edge to the top edge.

A disk conveying apparatus in accordance with the present invention comprises a body, a conveying arm, a power transmission device and a driving device. The body comprises an arm holder. The arm holder comprises an arm channel with a longitudinal passage and a transverse passage, where the longitudinal passage communicates with the transverse passage. The conveying arm is movably mounted in the arm holder and moves along the arm channel. The power transmission device connects to the conveying arm. The driving device connects to the power transmission device through which the driving device moves the conveying arm. The conveying arm has at least one linear self-alignment when the conveying arm moves along the transverse passage.

According to an embodiment of the present invention, the transverse passage comprises a top edge, a bottom edge and an urging edge. The top edge comprises a guiding step. The bottom edge comprises an urging step associated with the guiding step. The conveying arm comprises a first linear self-alignment and a second linear self-alignment when the conveying arm moves along the transverse passage. The first linear self-alignment is urged by the conveying arm abutting and moving along the urging step. The second linear self-alignment is urged by the conveying arm abutting and moving along the urging edge. Both the first linear self-alignment and the second linear self-alignment are upward movements from the bottom edge to the top edge.

The handling apparatus and the conveying apparatus have advantages and effects as follows.

Since the conveying arm has linear self-alignment to align the conveying arm with a given location when the conveying arm moves along the transverse passage, the conveying arm accurately accesses the disks at different locations to convey. The disks conveyed by the arm will not be damaged by accidental collisions or hits between the spindle and the disks during transportation.

Further, the disk conveying apparatus is compact and has simplified and standard components. The manufacturing cost is lowered. The disk conveying apparatus is convenient to use.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
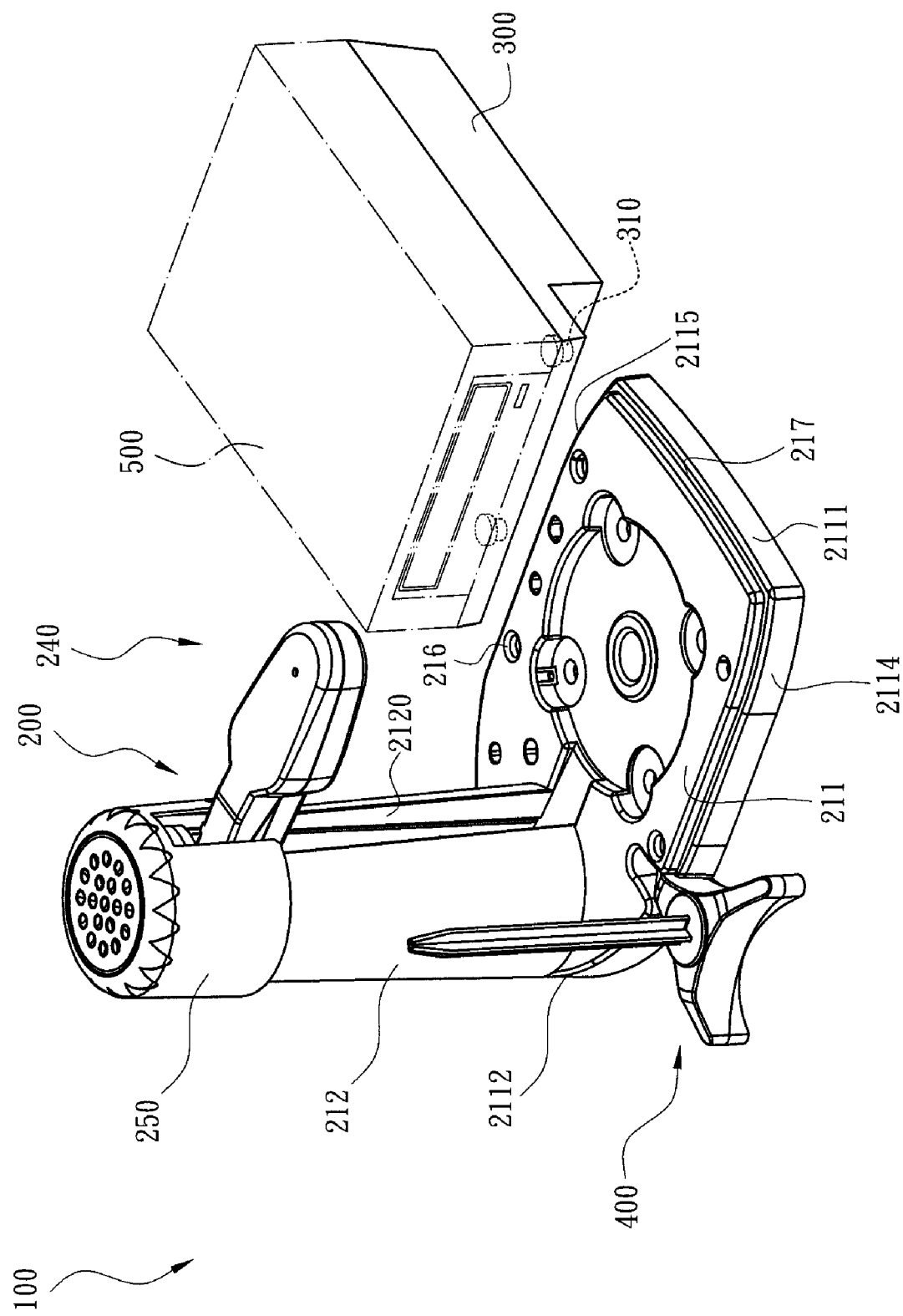
FIG. 1 is a perspective view of an embodiment of a handling apparatus in accordance with the present invention.

Reference will now be made in detail to the present preferred embodiments of the invention, examples of which are illustrated in the accompanying drawings. Wherever possible, the same reference numbers are used in the drawings and the description to refer to the same or like parts.

Refer to FIG. 1. An embodiment of a handling apparatus 100 in accordance with the present invention for conveying information storage disks comprises a disk conveying apparatus 200, a mounting base 300 and a disk holder 400. The mounting base 300 is demountably connected to the disk conveying apparatus 200 and supports a disk drive 500 with a tray. The disk holder 400 comprises a spindle and is demountably connected to the disk conveying apparatus 200. The spindle of the disk holder 400 can pass through the central holes of the disks to stake the disks.

Figure 2:
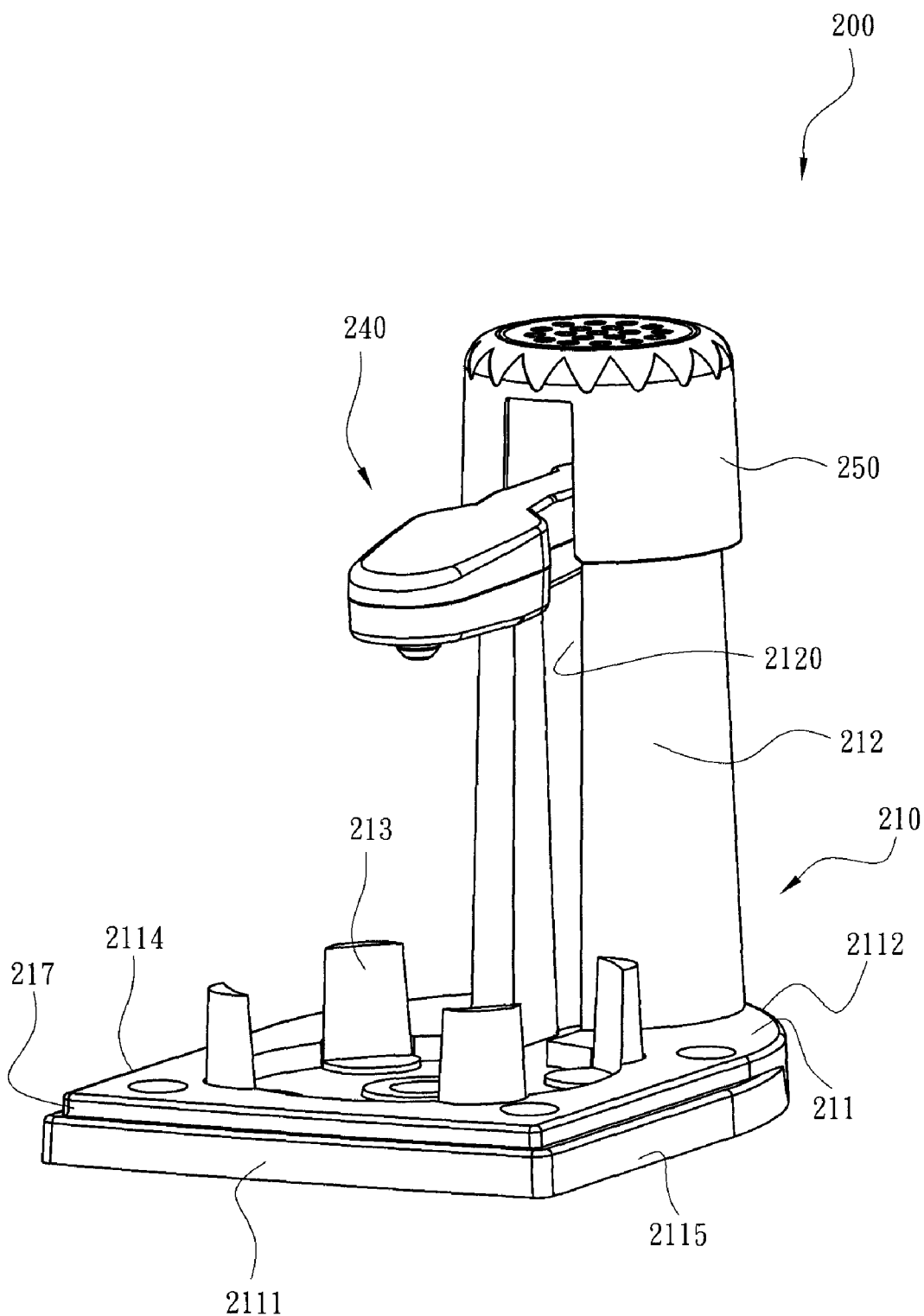
FIG. 2 is a perspective view of an embodiment of a conveying apparatus in accordance with the present invention.
Figure 3:
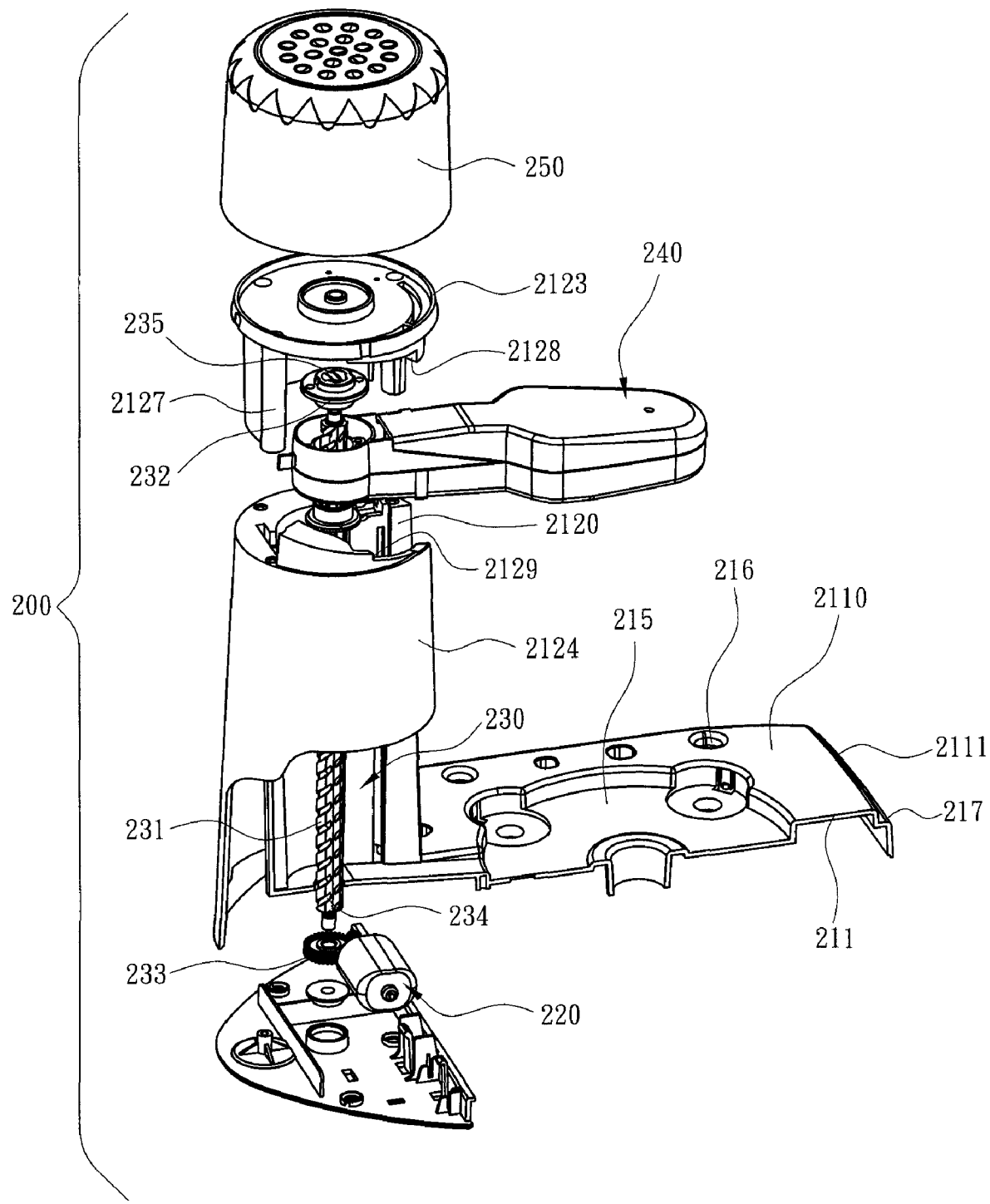
FIG. 3 is an exploded perspective view of a portion of the conveying apparatus in FIG. 2.

Refer to FIG. 2 and FIG. 3. The disk conveying apparatus 200 comprises a body 210, a driving device 220, a power transmission device 230, a conveying arm 240 and a cap 250. The body 210 comprises a base 211, an arm holder 212 and multiple disk-positioning members 213. The base 211 has a top 2110, a front 2111, a rear 2112, a left 2114 and a right 2115.

The base 211 comprises a disk area 215, positioning holes 216 and a connection portion 217. In the embodiment, the disk area 215 is a recess defined in the top 2110 in which the disks can be positioned. The positioning holes 216 are defined in the top 2110 at the left 2114 and the right 2115 of the base 211. The connection portion 217 is a shoulder defined along the left 2114, the front 2111 and the right 2115 to connect and support the mounting base 300.

The disk-positioning members 213 are demountably mounted on the top 2110 of the base 211 and are arranged alongside the disk area 215 to help stack and position the disks. In the embodiment, there are four disk-positioning members 213 that are equidistantly arranged alongside the disk area 215.

Figure 4:
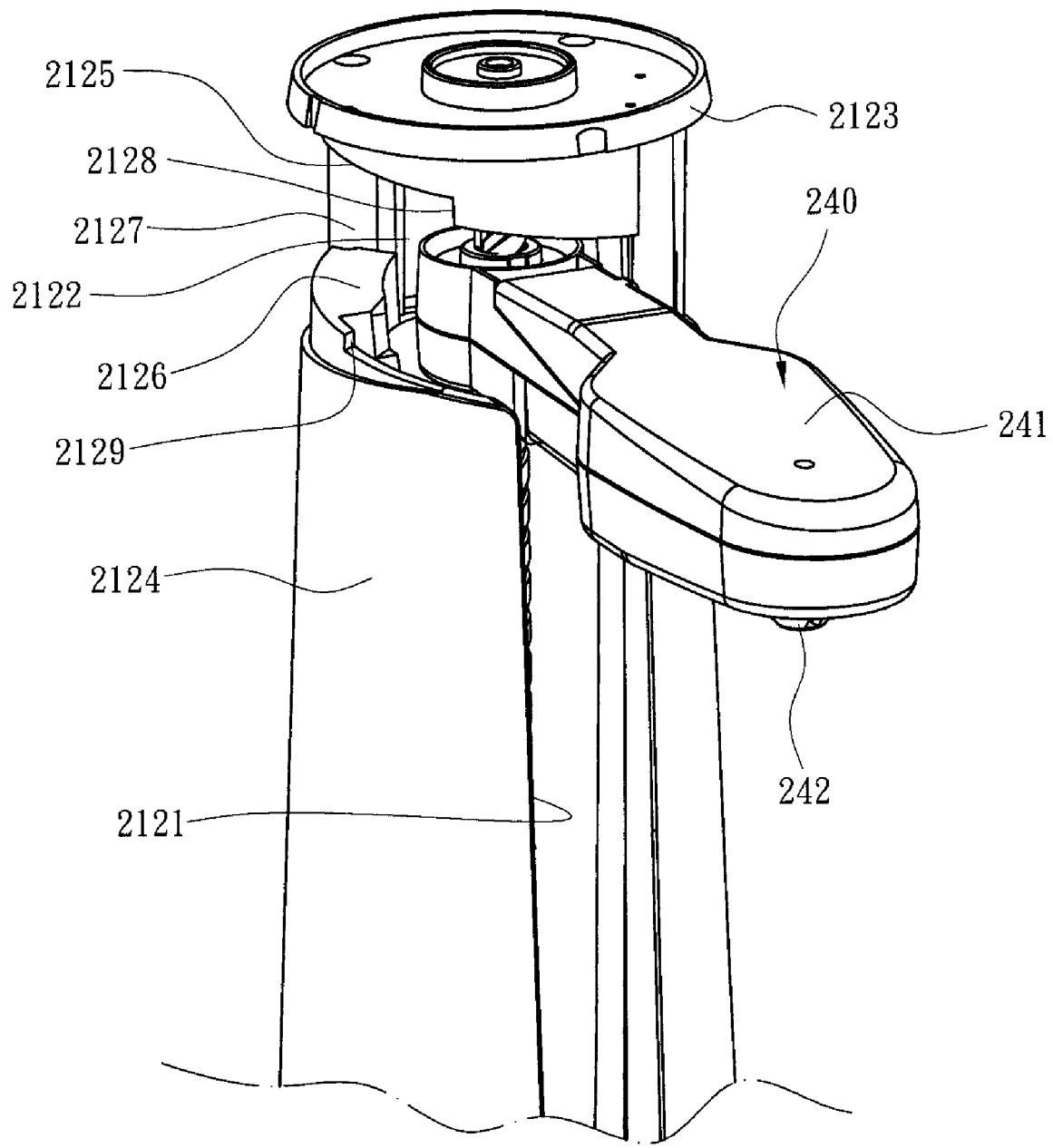
FIG. 4 is an enlarged perspective view of an arm holder with a conveying arm of the conveying apparatus in FIG. 2.

Further refer to FIG. 4. The arm holder 212 is mounted on the top 2110 at the rear 2112 of the base 211 to hold and guide movements of the conveying arm 240 along a transverse direction (i.e. left and right) and a longitudinal direction (i.e. up and down). In the embodiment, the upward movement of the conveying arm 240 means that the conveying arm 240 moves away from the base 211. The arm holder 212 and the base 211 can be integrally formed or be two separate parts combined with each other. The arm holder 212 has an arm channel 2120. The arm channel 2120 has a longitudinal passage 2121 and a transverse passage 2122 that communicate with each other. In the embodiment, the arm holder 212 has a tower shape, and comprises an upper portion 2123 and a lower portion 2124. The lower portion 2124 is integrally formed on the base 211. The upper portion 2123 is demountably mounted on the lower portion 2124. The longitudinal passage 2121 extends along the axis of the arm holder 212.

The transverse passage 2122 has a top edge 2125, a bottom edge 2126 and an urging edge 2127. The top edge 2125 has a guiding step 2128. The bottom edge 2126 has an urging step 2129. The guiding step 2128 and the urging step 2129 are associated with each other. The distance between the guiding step 2128 and the urging step 2129 is substantially larger than the width of the conveying arm 240.

The conveying arm 240 is movably mounted in the arm channel 2120 and moves along the arm channel 2120. The conveying arm 240 has a head 241 extended out of the arm holder 212. The head 241 has a disk-taking device 242. In the embodiment, the disk-taking device 242 is aligned with the center of the disk area 215.

The driving device 220 is mounted in the base 211 to move the conveying arm 240 along the arm channel 2120 by means of the power transmission device 230. In the embodiment, the driving device 220 is a motor.

The power transmission device 230 is mounted in the arm holder 212 and comprises a guide rod 231, a guide seat 232 and multiple transmission members 233. In the embodiment, the guide rod 231 is a screw rod and has a guiding thread 234. The guide seat 232 is a sleeve mounted around the guide rod 231 and fastened on the conveying arm 240. The guide seat 232 has an interior thread 235. The interior thread 235 engages the guiding thread 234 on the guide rod 231 so that when the guide rod 231 is rotated, the conveying arm 240 moves along the arm channel 2120 by the threads 234, 235. The transmission members 233 are reducing gears and are mounted between the driving device 220 and the guide rod 231. The driving device 220 rotates the guide rod 231 through the transmission members 233 so as to move the conveying arm 240 along the arm channel 2120 by the threads 234, 235.

The cap 250 is mounted on the upper portion 2123 of the arm holder 212 and covers the upper portion 2123.

Figure 7:
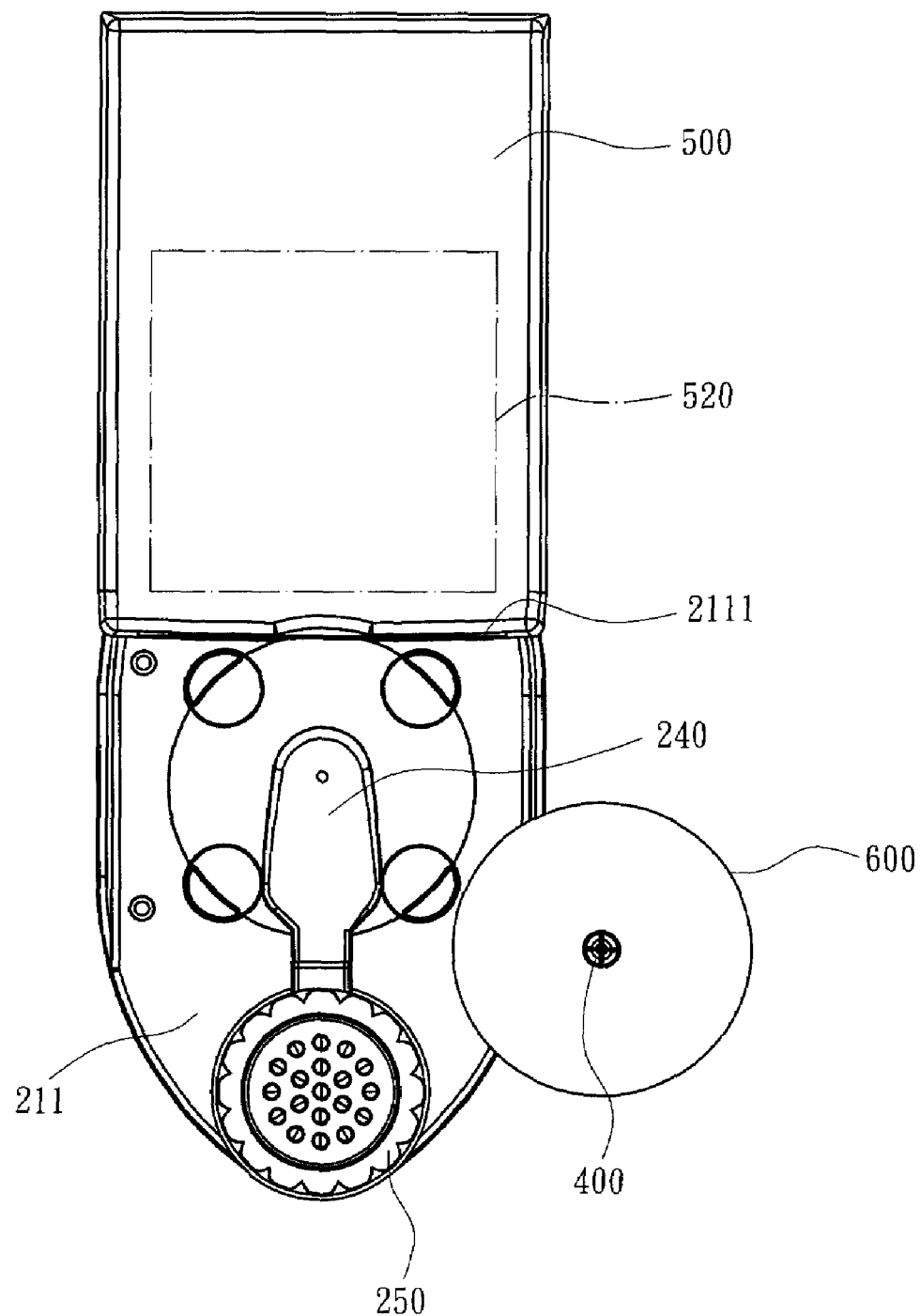
FIG. 7 is a top view of an embodiment of a handling apparatus in accordance with the present invention.
Figure 8:
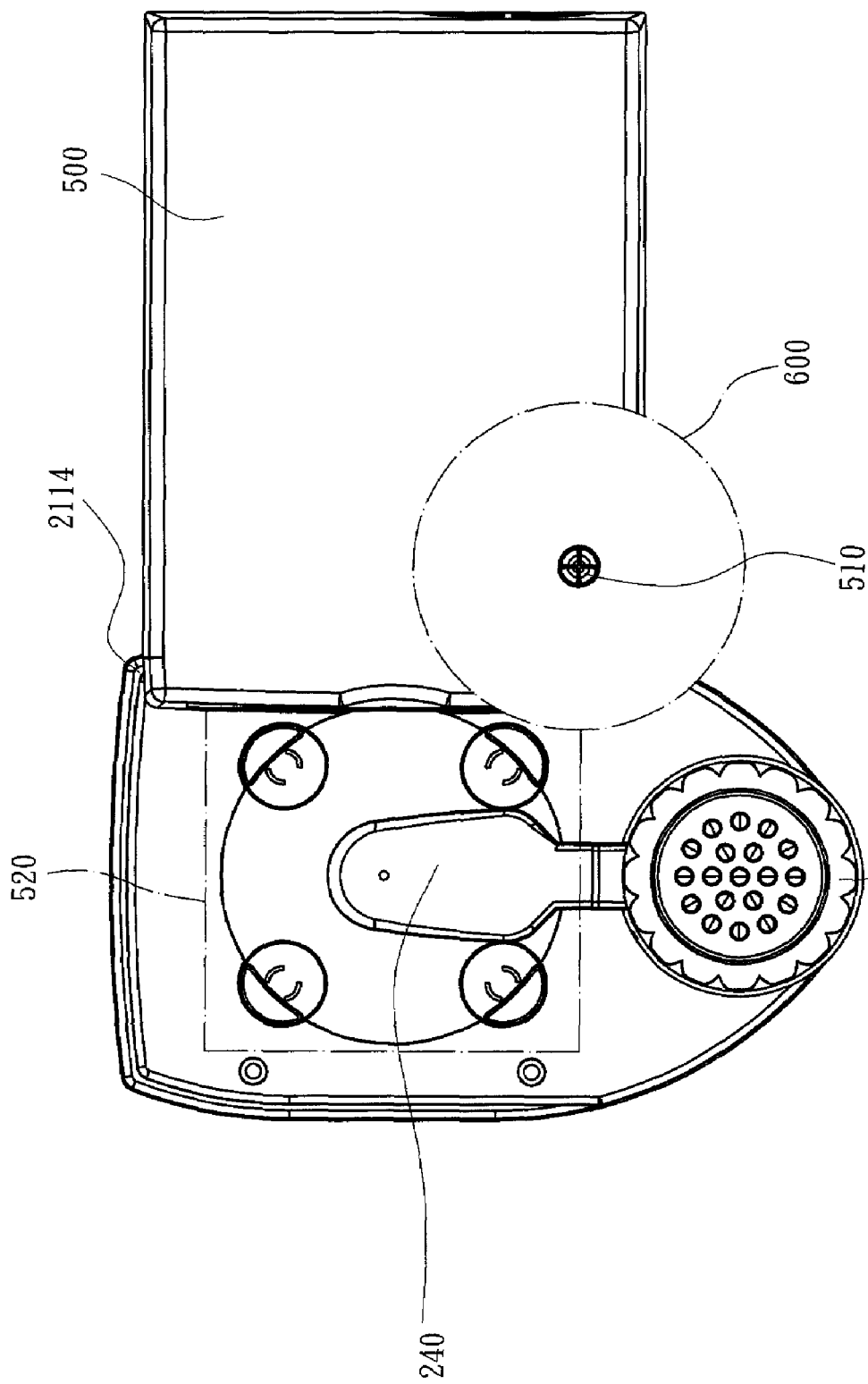
FIG. 8 is a top view of the handling apparatus in FIG. 7 with an alternative arrangement.

Refer to FIG. 1, FIG. 7 and FIG. 8. The mounting base 300 has multiple positioning protrusions 310 aligned respectively with the positioning holes 216 of one of the sides of the base 211. The mounting base 300 can be mounted on either the left 2114 or the right 2115 of the base 211 by placing the positioning protrusions 310 into the positioning holes 216. In addition, the mounting base 300 can be mounted at either the front 2111, the left 2114 or the right 2115 by placing the mounting base 300 on the connection portion 217. When a disk drive 500 is mounted on the mounting base 300, its tray is ejected at a position corresponding to the disk area 215 for the conveying arm 240 to conveniently take a disk from or place a disk on the tray. The disk drive 500 further comprises a demountable spindle 510 (in FIG. 8).

The disk holder 400 is demountably mounted at one side of the base 211 corresponding to the transverse passage 2122 of the arm channel 2120. In the embodiment, the disk holder 400 is mounted at left 2114 of the base 211 at a position under the guiding step 2128 and the urging step 2129.

Figure 6:
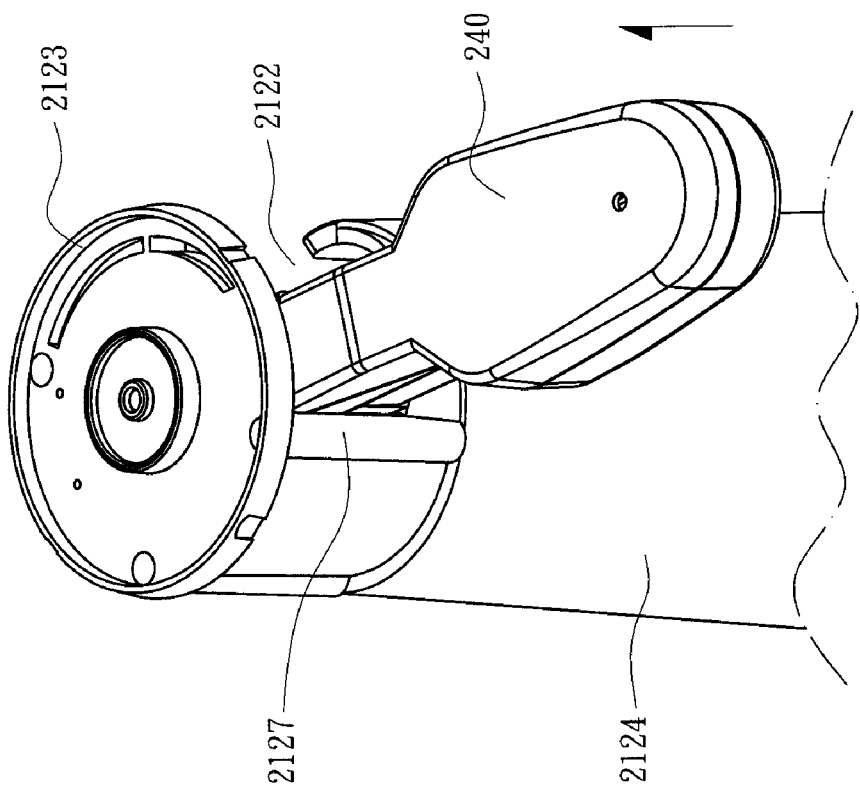
FIG. 6 is an operational perspective view of the arm holder with the conveying arm in FIG. 4 when the conveying arm abuts an urging edge to accomplish a linear self-alignment.
Figure 5:
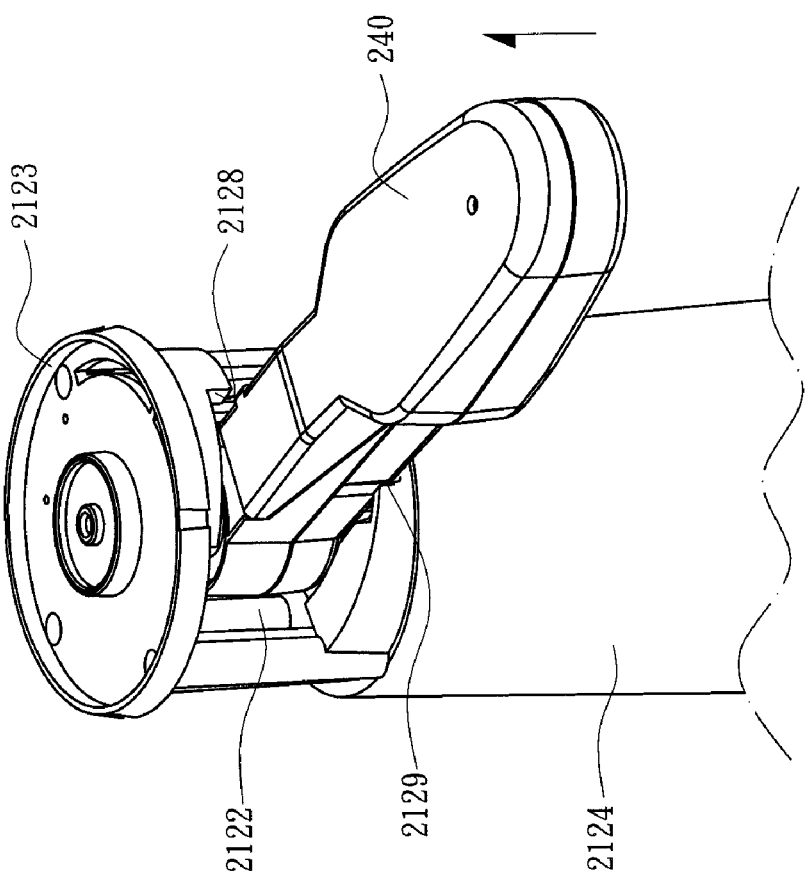
FIG. 5 is an operational perspective view of the arm holder with the conveying arm in FIG. 4 when the conveying arm abuts an urging step to accomplish a linear self-alignment.

Refer to FIG. 4, FIG. 5 and FIG. 6. The conveying arm 240 moves along the arm channel 2120 to convey disks among several different locations. In the embodiment, those locations include a first location where is the disk area 215 or location of the ejected tray, a second location where the conveying arm 240 abuts the urging step 2129 and a third location where the conveying arm 240 abuts the urging edge 2127. For example, when the present embodiment of the handling apparatus is applied to duplicate disks, the disk drive 500 is a disk burner.

When the duplication is completed or terminated abnormally, the tray 520 is ejected as shown in FIG. 8. The conveying arm 240 moves down until the disk-taking device 242 is inserted into the central hole of the disk on the tray 520 to take the disk from the tray 520. Rotating the guide rod 231 enables the conveying arm 240 to move upwardly along the longitudinal passage 2121 until the conveying arm 240 reaches the entrance of transverse passage 2122. The conveying arm 240 with the disk enters the transverse passage 2122 because of the rotations of the guide rod 231.

When the conveying arm 240 enters the transverse passage 2122 and abuts the urging step 2129 (as shown in FIG. 5), the conveying arm 240 will move along the urging step 2129 to accomplish a linear self-alignment because of the rotations of the guide rod 231. In the embodiment, the linear self-alignment is an upward movement as indicated by the arrow in FIG. 5 and provides good positioning effects of the conveying arm 240 at the second location for the disks. At this time, stopping the guide rod 231 and releasing the disk through the disk-taking device 242 allows the disk to fall precisely down onto the second location i.e. the central hole of the disk is precisely aligned with either the spindle of the disk holder 400 or the demountable spindle 510 to stack the disk at the second location.

If the guide rod 231 is continuously rotated after the linear self-alignment is completed along the urging step 2129, the conveying arm 240 moves along the transverse passage 2122 until the conveying arm 240 abuts the urging edge 2127 as shown in FIG. 6. Now, the conveying arm 240 is positioned at the third location. Likewise, the conveying arm 240 will move along the urging edge 2127 to accomplish a linear self-alignment because of the rotations of the guide rod 231. In the embodiment, the linear self-alignment is an upward movement as indicated by the arrow in FIG. 6 and provides good positioning effects of the conveying arm 240 at the third location for the disks. At this time, stopping the guide rod 231 and releasing the disk through the disk-taking device 242 allows the disk to fall down precisely onto the third location. Therefore, when the duplication is completed or terminated, the duplicated disks are moved and conveyed by the conveying arm 240 to the second location and are stacked by either the spindle of the disk holder 400 or the demountable spindle 510 while the failed disks are moved and conveyed by the conveying arm 240 to the third location to categorize the processed disks.

Figure 9:
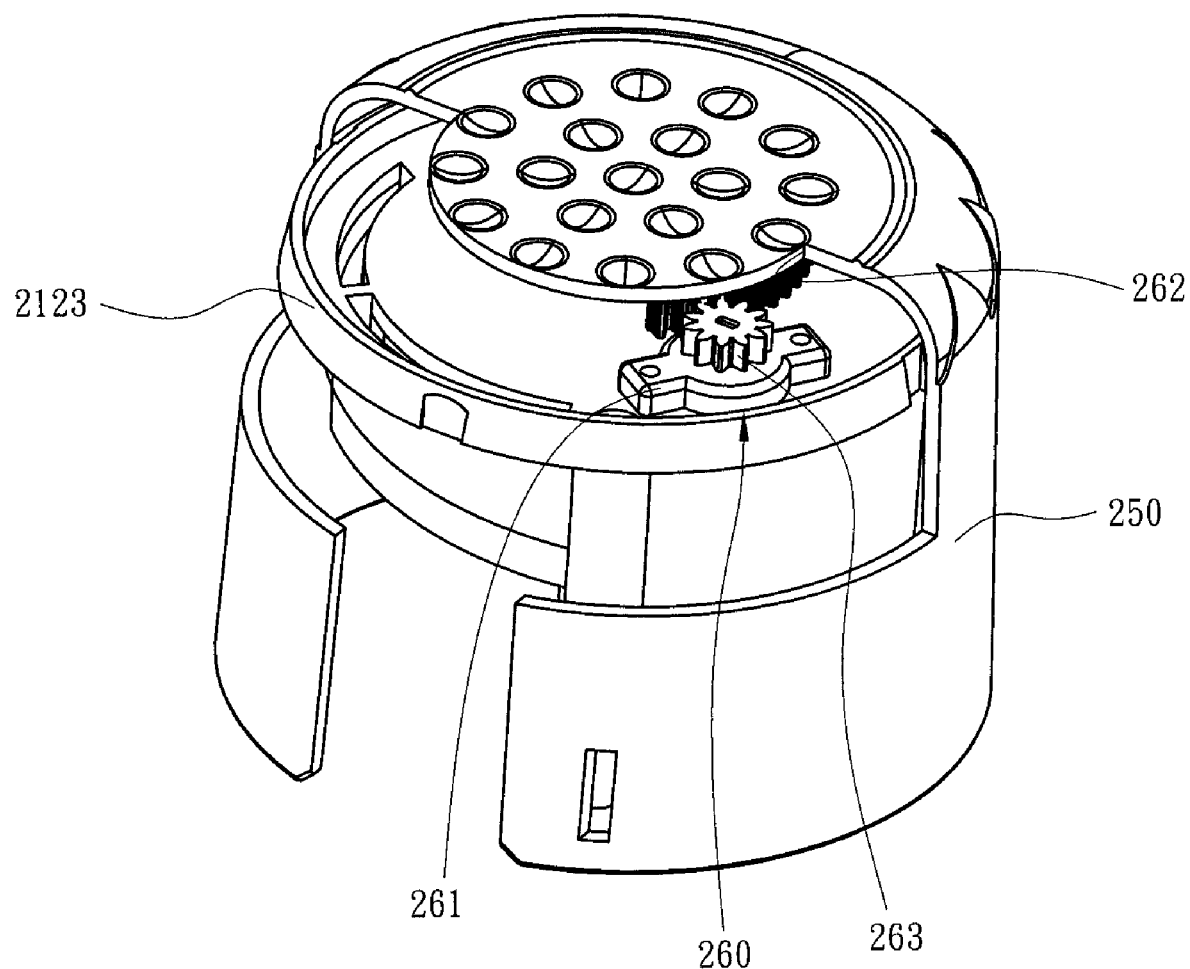
FIG. 9 is an enlarged, sectional and perspective view of an embodiment of a conveying apparatus with a damping device.

Refer to FIG. 9. A second embodiment of the handling apparatus 200 in accordance with the present invention further comprises a damping device 260. In the embodiment, the damping device 260 is mounted between the upper portion 2123 of the arm holder 212 and the cap 250 and comprises a damping member 261 and a curved rack 262. The damping member 261 is mounted in the upper portion 2123 of the arm holder 212 to provide damping characteristics and comprises a pinion 263. The curved rack 262 is mounted inside the cap 250 and engages the pinion 263. When the conveying arm 240 moves along the transverse passage 2122, the cap 250 is simultaneously rotated so that the curved rack 262 rotates the pinion 263 to allow the damping characteristic to decrease the speed of the conveying arm 240. Thus, good positioning effects are provided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A conveying apparatus for information storage disks, the conveying apparatus comprising
    a body comprising an arm holder, the arm holder comprising an arm channel with a longitudinal passage and a transverse passage, wherein the longitudinal passage communicates with the transverse passage;
    a conveying arm movably mounted in the arm holder and moveable along the arm channel;
    a power transmission device connected to the conveying arm to move the conveying arm; and
    a driving device connected to the power transmission device;
    wherein the conveying arm accomplishes at least a first linear self-alignment and a second linear self-alignment when the conveying arm moves along the transverse passage;
    wherein the transverse passage comprises
    a top edge comprising a guiding step;
    a bottom edge comprising an urging step associated with the guiding step; and
    an urging edge;
    wherein the first linear self-alignment is urged by the conveying arm abutting and moving along the urging step and the second linear self-alignment is urged by the conveying arm abutting and moving along the urging edge.

2. The conveying apparatus as claimed in claim 1, wherein both the first linear self-alignment and the second linear self-alignment are upward movements from the bottom edge to the top edge.

3. The conveying apparatus as claimed in claim 1, wherein the body further comprises a base on which the arm holder is integrally mounted.

4. The conveying apparatus as claimed in claim 1, wherein the arm holder comprises an upper portion and a lower portion, the lower portion is mounted on the base, the upper portion is demountably mounted on the lower portion.

5. The conveying apparatus as claimed in claim 1, wherein the conveying arm comprises a head extended out of the arm holder, and the head comprises a disk-taking device.

6. The conveying apparatus as claimed in claim 1, wherein the driving device is a motor, and the power transmission device comprises
    a guide rod having a guiding thread;
    a guide seat mounted around the guide rod, fastened on the conveying arm and having an interior thread for engaging the guiding thread; and
    multiple transmission members mounted between the driving device and the guide rod.

7. A conveying apparatus for information storage disks, the conveying apparatus comprising
    a body comprising an arm holder, the arm holder comprising an upper portion, a lower portion and an arm channel having a longitudinal passage and a transverse passage, wherein the longitudinal passage communicates with the transverse passage, and the upper portion is demountably mounted on the lower portion;
    a conveying arm movably mounted in the arm holder and moveable along the arm channel;
    a power transmission device connected to the conveying arm to move the conveying arm;
    a driving device connected to the power transmission device;
    a cap mounted on the upper portion; and
    a damping device mounted between the cap and the upper portion;

wherein the conveying arm accomplishes at least a first linear self-alignment and a second linear self-alignment when the conveying arm moves along the transverse passage;

wherein the transverse passage comprises a top edge comprising a guiding step;

a bottom edge comprising an urging step associated with the guiding step; and an urging edge;

wherein the first linear self-alignment is urged by the conveying arm abutting and moving along the urging step and the second linear self-alignment is urged by the conveying arm abutting and moving along the urging edge.

8. The conveying apparatus as claimed in claim 7, wherein the damping device comprises a damping member mounted in the upper portion of the arm holder to provide damping characteristics and comprising a pinion; and a curved rack mounted inside the cap and engaging the pinion.

9. The conveying apparatus as claimed in claim 7, wherein both the first linear self-alignment and the second linear self-alignment are upward movements from the bottom edge to the top edge.

10. The conveying apparatus as claimed in claim 7, wherein the body further comprises a base comprising a top and a disk area formed on the top; and multiple disk-positioning members mounted on the top of the base and arranged alongside the disk area.

11. The conveying apparatus as claimed in claim 10, wherein the total number of the disk-positioning members is four, and the disk-positioning members are equidistantly arranged alongside the disk area.

12. A handling apparatus for information storage disks, the handling apparatus comprising a disk conveying apparatus comprising a body comprising an arm holder and a base, the arm holder comprising an arm channel having a longitudinal passage and a transverse passage, wherein the longitudinal passage communicates with the transverse passage, and the base comprises a top, a front, a rear, a left and a right wherein the arm holder is mounted at the rear;

a conveying arm movably mounted in the arm holder and moveable along the arm channel;

a power transmission device connected to the conveying arm to move the conveying arm; and a driving device connected to the power transmission device;

wherein the conveying arm accomplishes at least a first linear self-alignment and a second linear self-alignment when the conveying arm moves along the transverse passage; and a mounting base demountably connected to the disk conveying apparatus at one of the front, the left and the right of the base;

wherein the transverse passage comprises a top edge comprising a guiding step;

a bottom edge comprising an urging step associated with the guiding step; and an urging edge;

wherein the first linear self-alignment is urged by the conveying arm abutting and moving along the urging step and the second linear self-alignment is urged by the conveying arm abutting and moving along the urging edge.

13. The handling apparatus as claimed in claim 12, wherein the mounting base supports a disk drive having a tray and a spindle, and the spindle is located at a position corresponding to the urging step and the guiding step.

14. The handling apparatus as claimed in claim 12, further comprising a disk holder demountably mounted at one of the left and the right of the base under the transverse passage of the arm channel and is located at a position under the guiding step and the urging step.

15. The handling apparatus as claimed in claim 12, wherein the arm holder comprises an upper portion and a lower portion wherein the upper portion is demountably mounted on the lower portion, and the disk conveying apparatus further comprises a cap mounted on the upper portion; and a damping device mounted between the cap and the upper portion.

16. The handling apparatus as claimed in claim 15, wherein the damping device comprises a damping member mounted in the upper portion of the arm holder to provide damping characteristics and comprising a pinion; and a curved rack mounted inside the cap and engaging the pinion.

17. The handling apparatus as claimed in claim 12, wherein the base further comprises a plurality of positioning holes defined in the top at the left and the right of the base; and a connection portion comprising a shoulder defined along the left, the front and the right of the base.

* * * * *